Dec. 13, 1955  J. A. WHITE, JR., ET AL  2,726,464
LAND LEVELER

Filed June 12, 1953  3 Sheets-Sheet 1

INVENTORS
John A. White Jr
Joseph P. Conroy
BY
ATTORNEYS

Dec. 13, 1955   J. A. WHITE, JR., ET AL   2,726,464
LAND LEVELER
Filed June 12, 1953   3 Sheets-Sheet 2

INVENTORS
John A. White Jr.
Joseph P. Conroy
BY
ATTORNEYS

Dec. 13, 1955 J. A. WHITE, JR., ET AL 2,726,464
LAND LEVELER
Filed June 12, 1953 3 Sheets-Sheet 3
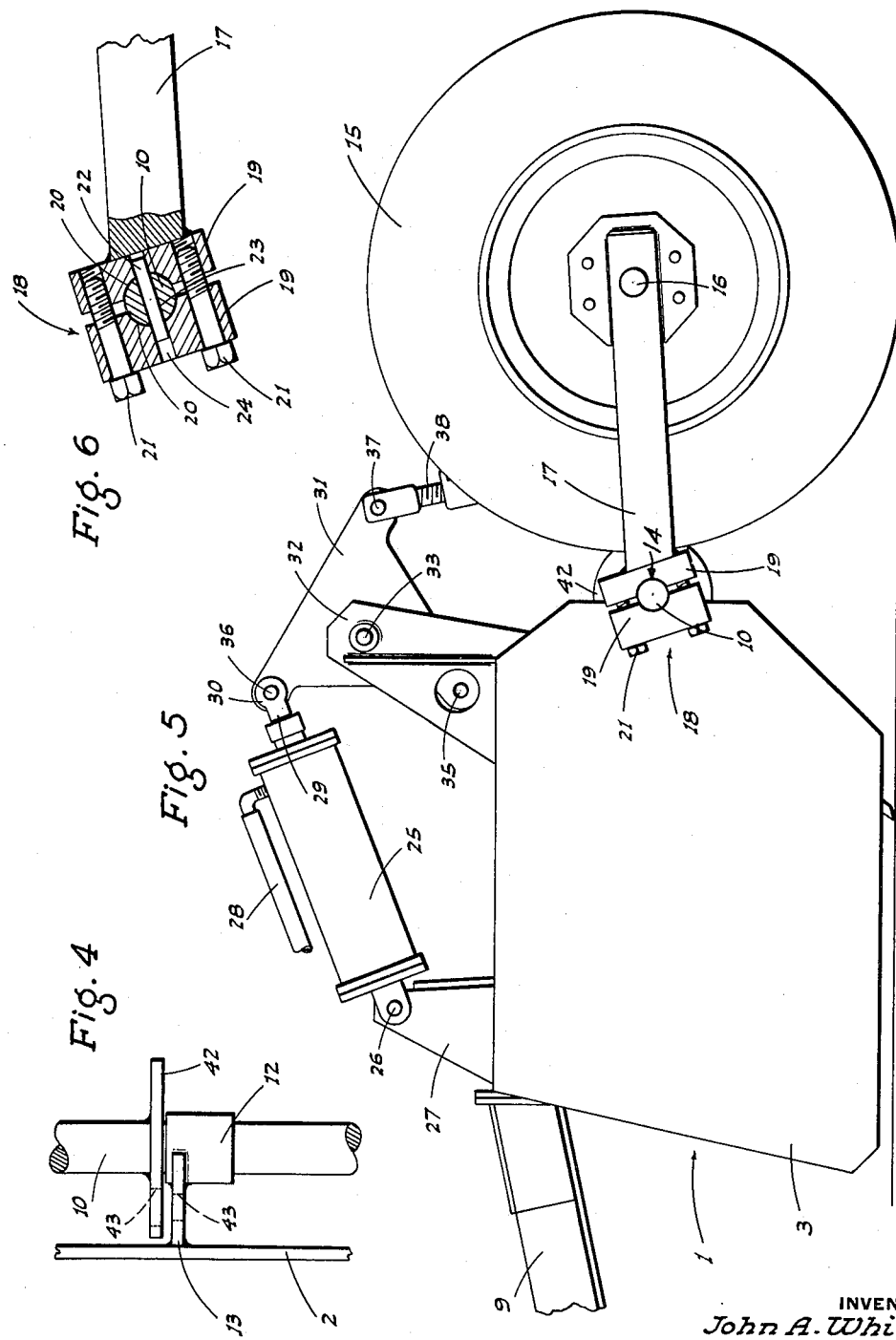
INVENTORS
John A. White Jr
Joseph P. Conroy
BY
ATTORNEYS

United States Patent Office 2,726,464
Patented Dec. 13, 1955

2,726,464
LAND LEVELER

John A. White, Jr., and Joseph P. Conroy, Gilroy, Calif., assignors to Be-Ge Manufacturing Co., Gilroy, Calif., a corporation of California Application June 12, 1953, Serial No. 361,156

1 Claim. (Cl. 37—169)

This invention relates generally to improvements in a tractor-drawn, land leveler, and particularly to one of the type which includes a pair of transversely spaced, ground engaging wheels adapted to be mounted at the sides of the scraper bowl for use of the implement when forming borders or checks, or to the rear of said bowl for earth moving or land leveling, selectively.

In the implement a fluid pressure actuated power cylinder is employed to reversibly part-rotate a cross shaft to which the wheels are secured by mounting arms which project forwardly from the shaft when the wheels are at the sides of the bowl, and project rearwardly from the shaft when the wheels are at the rear of the bowl; it being a major object of the invention to provide a novel motion transmitting mechanism between the power cylinder and said cross shaft.

Another important object of the invention is to provide an implement, as in the preceding paragraph, wherein said motion transmitting mechanism is arranged for differential connection with the power cylinder, whereby the latter is operative in one position of connection to part-rotate the shaft in one direction, and operative in the other position of connection to part-rotate the shaft in in the opposite direction. The purpose of such arrangement is to relatively lower the wheels, whether at the sides or to the rear of the bowl, on the pushing or extending stroke of the power cylinder, as is desirable.

An additional object of the present invention is to provide a novel clamping unit, on the inner end of each wheel mounting arm, adapted to connect said arm to the cross shaft in a forwardly or rearwardly projecting position, selectively; each such clamping unit being readily releasable and re-engageable for the purpose of changing the related wheel mounting arm from one of said positions to the other.

It is also an object of the invention to provide a land leveler which is designed for ease and economy of manufacture; ruggedly built; constructed for long life; and simple in operation and maintenance.

Still another object of the invention is to provide a practical and reliable land leveler, and one which will be exceedingly effective for the purpose for which it is designed.

These objects are accomplished by means of such structure and relative arrangement of parts as will fully appear by a perusal of the following specification and claim.

In the drawings:

Fig. 4 is a fragmentary plan view showing the cross shaft locking assembly.

Fig. 5 is a side elevation of the land leveler showing the parts in the positions with the wheels disposed at the rear of the bowl; the wheels being relatively raised whereby said bowl is in lowered working position.

Fig. 6 is an enlarged side elevation, mainly in section, showing one of the wheel mounting arm clamping units.

Figure 1:
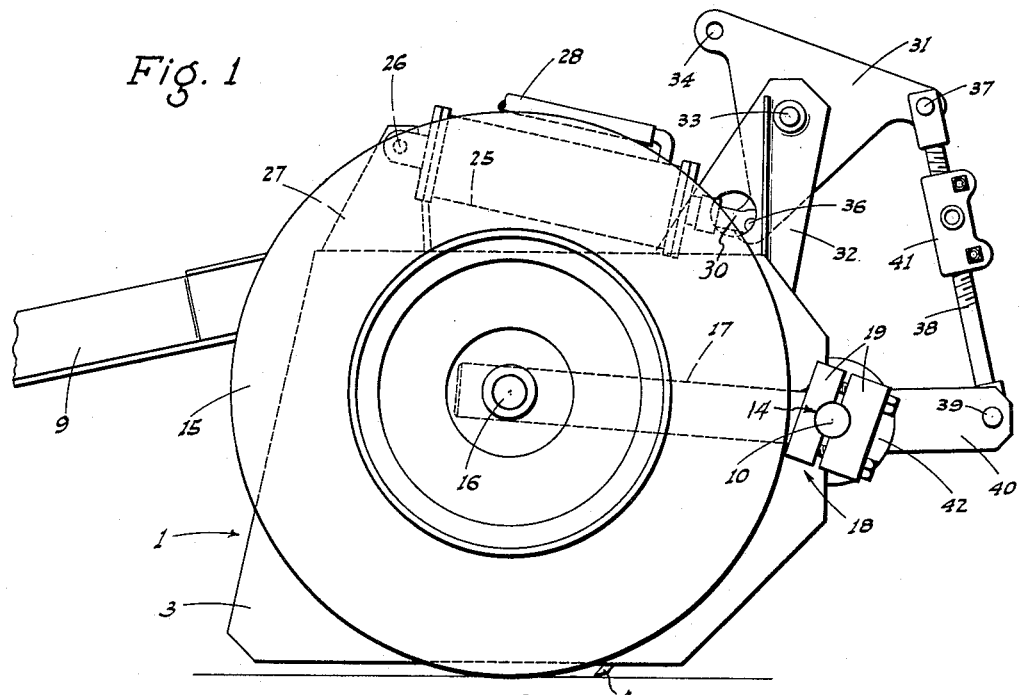
Fig. 1 is a side elevation of the land leveler showing the parts in the positions with the wheels mounted at the sides of the bowl; the wheels being relatively raised so that the bowl is in lowered working position.

Referring now more particularly to the characters of reference on the drawings, the implement comprises a scraper bowl, indicated generally at 1, and which bowl includes an upstanding, transversely extending back wall 2 connected, at the ends, to forwardly projecting side skirts 3; there being a cutting blade 4 secured to the lower edge of the back wall 2 and extending from side to side of said bowl.

The bowl 1 additionally includes, at the top, a front cross beam 5 and a rear cross beam 6; such cross beams being connected at the ends but inwardly of the side skirts 3 by end beams 7.

A longitudinal mounting plate 8 spans between, and is rigidly connected to, the cross beams 5 and 6 centrally of the sides of the bowl.

A draft tongue 9 is fixed to, and projects forwardly from, the front cross beam 5 at a center point; such tongue being adapted for coupling to a tractor in draft relation.

A horizontal cross shaft 10 extends full width of the bowl 1 to the rear of the latter; such shaft being carried in end bearings 11 and intermediate bearings 12. The end bearings 11 are secured to the rear ends of the side skirts 3, while the intermediate bearings 12 are secured to the back wall 2 by rigid attachment webs 13.

The horizontal cross shaft 10 projects at the ends beyond the bearings 11—i. e. laterally outwardly with respect to the side skirts 3—the projecting end portions of the shaft being indicated at 14.

The implement is supported by a pair of rubber-tire wheels 15 disposed in transversely spaced relation, and each mounted by a laterally projecting spindle 16 on the outer end of a wheel mounting arm 17.

Figure 2:
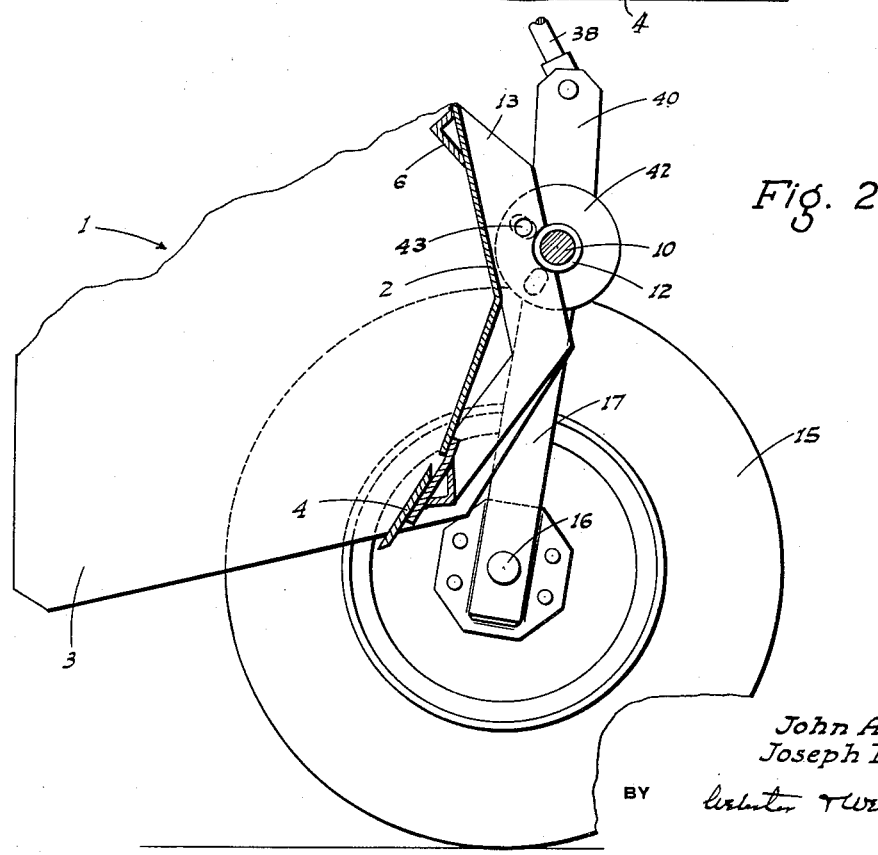
Fig. 2 is a similar view, but shows the position of the parts with the wheels relatively lowered whereby to raise the bowl.
Figure 3:
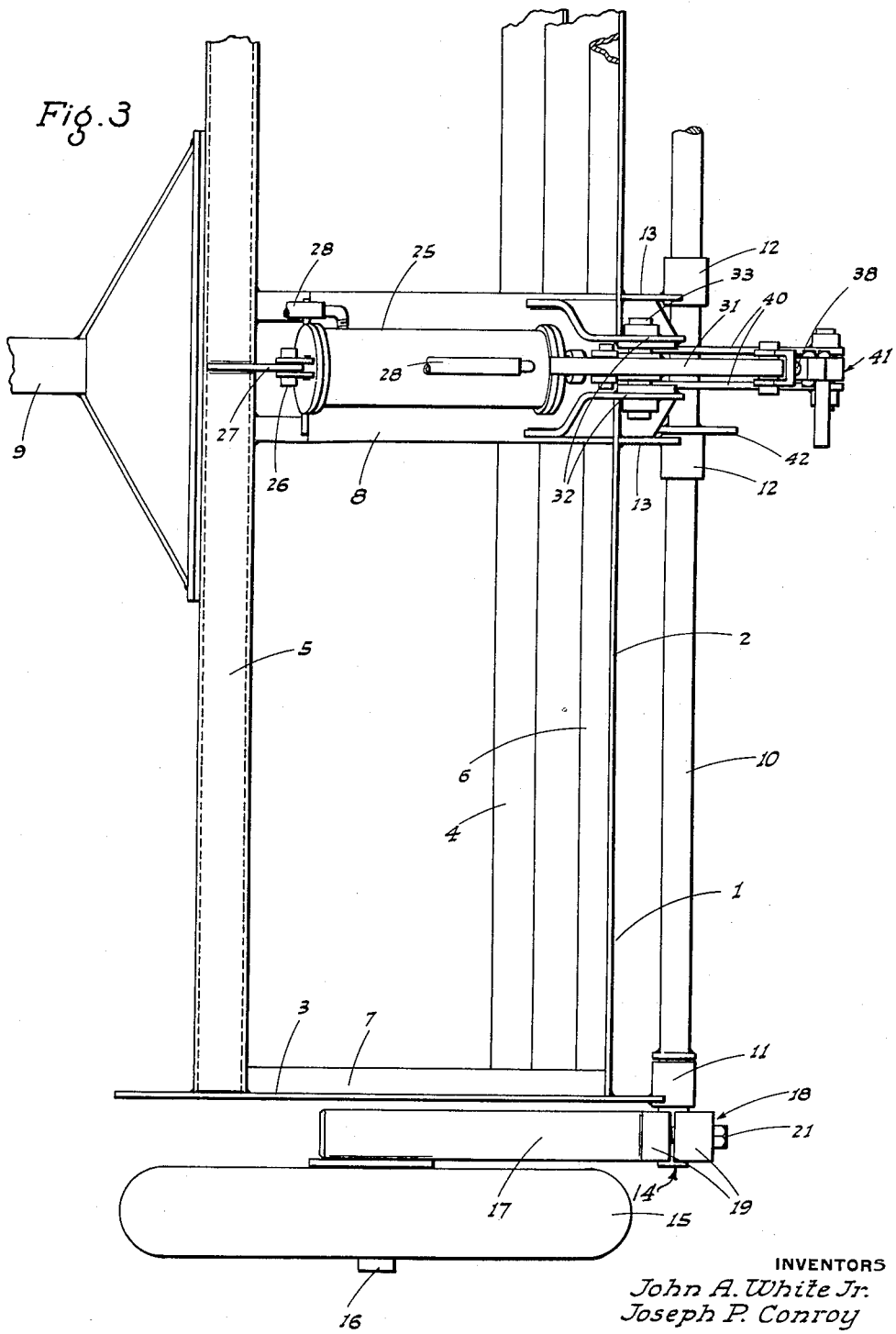
Fig. 3 is a fragmentary top plan of the land leveler arranged as in Figs. 1 and 2.

At the inner end thereof each wheel mounting arm 17 carries a clamping unit, indicated generally at 18; the purpose of each such clamping unit being to secure the related mounting arm 17 on the corresponding projecting end portion 14 of cross shaft 10, with said mounting arm 17 projecting forwardly, as in Figs. 1–3, or projecting rearwardly, as in Fig. 5, selectively.

Each clamping unit 18 comprises a pair of complementary blocks 19, to one of which the related wheel mounting arm 17 is fixed; the blocks 19 having matching, substantially half-circle seats 20 which receive the corresponding projecting end portion 14 of cross shaft 10. The complementary blocks 19 are normally rigidly secured in clamping relation on the corresponding shaft end portion 14 by bolts 21.

The blocks 19 are maintained in proper location on the corresponding shaft end portion 14 by a transverse locator pin 22 which extends through a bore 23 in the shaft end portion 14, and into bores 24 in the blocks 19; the pins 22 being fixed in said shaft.

By the simple expedient of removing the bolts 21 and reversing blocks 19, each wheel mounting arm 17 can be adjusted from a position projecting forwardly alongside the bowl 1 to a position projecting rearwardly thereof, or vice versa.

When the mounting arms 17 are secured by the clamping units in their forwardly projecting position, the spindles 16 project outwardly, so that the wheels 15 clear the sides 30 of the bowl 1. When the mounting arms 17 are secured in their rearwardly projecting position they are disposed with the spindles projecting inwardly so that the wheels 15, which are then rearwardly of the bowl 1, lie inwardly of the longitudinal planes of the side skirts 3.

With the foregoing arrangement the wheels 15 can be readily and conveniently mounted on the implement at the sides of the bowl 1 for building borders or checks, or rearwardly of said bowl for land leveling and other earth moving operations.

The adjustment of the wheels 15 relatively up or down, whereby to lower or raise the bowl 1, respectively, is accomplished as follows:

A longitudinal, double-acting, fluid pressure power cylinder 25 is disposed above the mounting plate 8; such cylinder being pivoted, at its forward end, as at 26, to an upstanding bracket 27. The power cylinder 25, being double-acting, is controlled by a valve-regulated, fluid pressure supply conduit system, shown only in part as at 28, but which system is supplied and valve-regulated from the tractor in a conventional manner.

The power cylinder 25 includes a piston rod 29 adapted to push or project rearwardly from an initially advancing or retracted position; such piston rod being fitted, at its outer end, with a clevis 30.

A rotary motion transmitting plate 31 is disposed between a pair of brackets 32 which upstand from the bowl at the rear; such motion transmitting plate 31 being centrally journaled, as at 33, between the brackets 32. In the present embodiment the rotary motion transmitting plate 31 is generally triangular, disposed with two of the corners in vertically spaced relation forwardly of the central journal 33, and the other corner disposed rearwardly of said central journal, as shown.

The vertically spaced forward corners of the rotary motion transmitting plate 31 are formed with transverse bores 34 and 35; the clevis 30 being adapted to be pivotally connected with either of said corners, selectively, by means of a suitable removable pivot pin 36.

At the rear corner of the rotary motion transmitting plate 31 the same is pivotally connected, as at 37, to the upper end of a connecting rod 38, whose lower end is pivotally connected, as at 39, to the rear end of a radial arm 40 fixed on, and projecting rearwardly from, the horizontal cross shaft 10. A turn-buckle 41 is interposed in the connecting rod 38 for the purpose of adjusting the effective length thereof.

When the wheel mounting arms 17 are set in their forwardly projecting position, as in Figs. 1–3 inclusive, with the wheels 15 alongside the side skirts 3, the clevis 30 is pivotally connected to the lower front corner of the rotary motion transmitting plate 31. Consequently, when the power cylinder 25 is extended—i. e. to thrust the piston rod 29 outwardly in a rearward direction—the rotary motion transmitting plate 31 is part-turned counter-crosswise, raising the connecting rod 38 and radial arm 40, with the result that the cross shaft 10 is part-turned in a direction to swing the wheel mounting arms 17 and wheels 15 relatively downwardly, whereby to raise the bowl 1.

On the other hand, when the wheel mounting arms 17 are set in their rearwardly projecting position, with the wheels 15 to the rear of the bowl 1, the clevis 30 is connected to the upper front corner of the rotary motion transmitting plate 31, so that extension of the power cylinder 25 rotates said plate clockwise, thrusting downwardly on the connecting rod 38 and radial arm 40. This rotates the cross shaft 10 in a direction to swing the wheel mounting arms 17 and wheels 15 relatively downwardly, resulting in raising of the bowl 1.

Thus, by reason of the foregoing differential connections of the clevis 30 with the rotary motion transmitting plate 31, the power cylinder 25 works in each instance, and upon the extending or pushing stroke, to cause relative downward motion of the wheels 15 whether the mounting arms 17 are in their forwardly projecting or rearwardly projecting positions.

As the clevis 30 can be readily secured to either the lower or upper front corner of the rotary motion transmitting plate 31, and as the mounting arms 17 are easily reset, by the clamping units 18, to project forwardly or rearwardly, the implement can be adjusted in a convenient and simple manner for the different types of work; i. e., forming borders or checks with the mounting arms 17 projecting forwardly, or for land leveling or other earth moving with said mounting arms 17 projecting rearwardly.

The invention thus provides a very versatile implement, readily adapted to the different uses for which it is designed.

For transport of the implement from place to place with the wheels 15 relatively lowered and the bowl 1 raised, and at which time it is desirable to relieve the load from the power cylinder 25, the following locking assembly is provided:

A disc 42 is fixed to the cross shaft 10 adjacent one of the intermediate bearings 12, which disc lies adjacent to and laps the related attachment web 13. The disc 42 and such related attachment web 13 are formed with holes 43 which match when the wheels are lowered and the bowl raised; a suitable locking element (not shown) being projected through the matching holes 43 to then lock the disc 42, and consequently the shaft 10, against rotation.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a land leveler which includes a bowl, a cross shaft journaled in connection with the bowl at the rear and projecting beyond the sides thereof, a pair of wheel mounting arms, and a wheel on each of said arms adjacent one end thereof; a clamping unit on the other end of each wheel mounting arm adapted for detachable clamping engagement with a corresponding projecting end portion of the cross shaft with the arm extending rearwardly or forwardly, selectively; each clamping unit comprising a pair of complementary clamping blocks having facing seats adapted to receive said corresponding projecting end portion of the cross shaft in reversible relation and from opposite sides, draw bolts connecting the blocks above and below said cross shaft end portion, and a locator pin extending through said cross shaft end portion and projecting at both ends beyond the shaft; the block having alined holes into which the projecting portions of the pin fit with either position of the clamping unit on the shaft.

References Cited in the file of this patent

UNITED STATES PATENTS

| Number | Name | Date |
|---|---|---|
| 317,780 | Helms et al. | May 12, 1885 |
| 1,192,155 | Baker | July 25, 1916 |
| 1,410,084 | Viar | Mar. 21, 1922 |
| 1,822,051 | Lytle | Sept. 8, 1931 |
| 2,208,526 | Gurries | July 16, 1940 |
| 2,351,830 | Mitchell et al. | June 24, 1944 |
| 2,530,565 | Briscoe | Nov. 21, 1950 |
| 2,612,826 | Williams | Oct. 7, 1952 |